United States Patent
de Souza et al.

(10) Patent No.: US 7,567,253 B2
(45) Date of Patent: Jul. 28, 2009

(54) MIRROR DRIVER NOTIFICATION OF DEVICE INDEPENDENT BITMAP DRAWING CALLS

(75) Inventors: Jeremy de Souza, Redmond, WA (US); Pravin K. Santiago, Issaquah, WA (US); Stephen H. Wright, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 446 days.

(21) Appl. No.: 11/395,041

(22) Filed: Mar. 31, 2006

(65) Prior Publication Data

US 2007/0229519 A1  Oct. 4, 2007

(51) Int. Cl.
G06T 1/00 (2006.01)
G06F 13/14 (2006.01)
G06F 3/00 (2006.01)

(52) U.S. Cl. .................. 345/522; 345/520; 719/322; 719/323; 719/324

(58) Field of Classification Search ......... 719/321–327; 345/520, 522
See application file for complete search history.

(56) References Cited

U.S. PATENT DOCUMENTS 6,104,359 A * 8/2000 Endres et al. ............... 345/589
6,683,618 B1 * 1/2004 Patrick et al. ............... 345/619

* cited by examiner

*Primary Examiner*—Hau H Nguyen
(74) *Attorney, Agent, or Firm*—Workman Nydegger

(57) ABSTRACT

Described is a technology including a mechanism that when activated, detects a call to a device independent bitmap. An appropriate mirror driver, such as one or more registered as an accessibility driver, may then be notified of the call. The mechanism may be activated upon creation or selection of the device independent bitmap, and may comprise a wrapper/driver that, from the perspective of the mirror driver, simulates a call to a device dependent bitmap. The notification may be performed by having the driver communicate a function call that emulates a drawing primitive to the mirror driver.

19 Claims, 5 Drawing Sheets

MIRROR DRIVER NOTIFICATION OF DEVICE INDEPENDENT BITMAP DRAWING CALLS

COPYRIGHT DISCLAIMER

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Contemporary computer systems offer users assistive technology, typically for providing visually-impaired users with better accessibility to computers. For example, screen readers can be used to output text to speech and Braille, while screen magnification programs can be used to make displayed screen content more viewable.

Previous assistive programs worked by inserting a driver in the video path above the main display driver (essentially in a serial display driver chain) to intercept graphics primitives, processing the primitives to build an off screen model, and then outputting the off screen model in some way. An improvement in assistive technology includes mirror drivers, which unlike chained drivers are not inserted into the video path of the main display driver. Instead, a mirror driver essentially receives graphics primitives as a peer to the main display driver.

A recent accessibility technology that provides an alternative to (or a complement to) driver-based magnifiers is described in U.S. patent application Ser. No. 11/180,859, filed Jul. 12, 2005, assigned to the assignee of the present invention and hereby incorporated by reference. This technology is (among its aspects) generally directed towards a magnification engine and API (application programming interface) that magnifier applications can leverage, and that renders a magnifier in software and/or hardware.

Among the requirements of assistive technology programs is that they correctly reflect what is on the display screen. This causes problems with device independent bitmaps (DIBs), because for such bitmaps the display driver is not called with the instructions that modify the bitmap. For example, application calls to GDI (the graphics device interface of Microsoft® Windows®) may result in a device independent bitmap being drawn to a separate surface. GDI itself also may not forward all such calls to drivers at the driver level. In general, the driver can only see the bits, but not the calls that drew the bits.

As a result, an accessibility display driver, whether chained or mirrored, is never aware of drawing calls made to such bitmaps via the usual rendering path, and only sees the resultant bits. However there is a lot of information in these calls that an accessibility driver needs to see. For example, a text-to-speech or text-to-Braille converter wants to see the actual text that is to be drawn, rather than the bits that resulted from the text being drawn.

Approaches to solving this problem include patching operating system components (e.g., Win32k.sys) in memory, or calling undocumented kernel interface entry points, in order to populate off-screen models with information about drawing calls to off-screen device independent bitmaps (DIBs). These approaches are particularly volatile with respect to system stability and integrity, and as such are not desirable.

Another way to capture calls to device independent bitmaps (DIBs) in a serial display driver chain model is to modify surface data structures, in order to associate a surface with the display driver that wants to capture the calls. As a result of the association, any drawing to this surface (DIB) is sent to the chained display driver that performed the modification. When this occurs, the chained display driver is able to disassociate the real display driver from the surfaces before forwarding the call, e.g., by resetting flags in the surface data structure, and calling support functions if the source and destination bitmaps are both device independent bitmaps. Note that when this condition is not fulfilled, the call is forwarded to the real display driver.

However, with a mirror driver, this same technique cannot be used without potentially crashing other mirror drivers, because once the surface association is made, all mirror drivers will get calls in parallel, including for bitmaps for which they have not allocated a device dependent bitmap. As a result, specific methods involving surface association calls are incompatible when multiple accessibility mirror drivers are on the system.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology including a mechanism that when activated, detects a call to a device independent bitmap. An appropriate mirror driver, such as one or more registered as an accessibility driver, may then be notified of the call.

The mechanism may be activated upon creation or selection of the device independent bitmap, and may comprise a wrapper/driver that, from the perspective of the mirror driver, simulates a call to a device dependent bitmap. The notification may be performed by having the driver communicate a function call that emulates a drawing primitive to the mirror driver.

Other advantages will become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
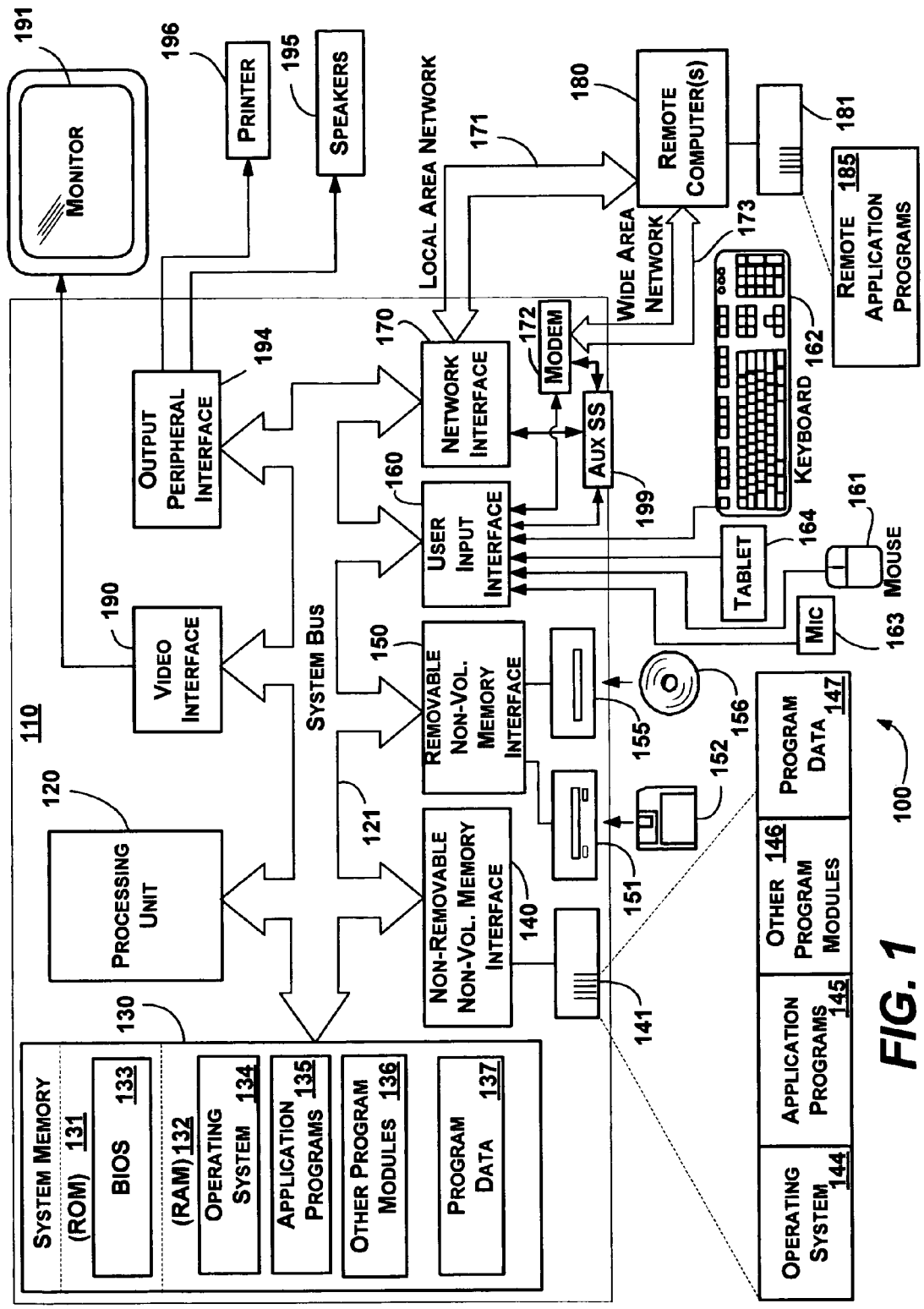
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

An auxiliary display subsystem 199 may be connected via the user interface 160 to allow data such as program content, system status and event notifications to be provided to the user, even if the main portions of the computer system are in a low power state. The auxiliary display subsystem 199 may be connected to the modem 172 and/or network interface 170 to allow communication between these systems while the main processing unit 120 is in a low power state.

Mirror Driver Notification of DIB Drawing Calls

Various aspects of the technology described herein are directed towards a technology that provides notifications for drawing calls to device independent bitmap (DIB) sections (which can be considered equivalent to monochrome bitmaps for purposes of notification; monochrome bitmaps are generally not referred to herein). As will be understood, the notification model provides an alternative to kernel patching and other solutions, and also works in conjunction with accessibility mirror drivers.

In one example implementation described herein, a notification model is described in the example context of a Windows®-based operating system architecture. However, as will be understood, the present invention is not limited to Windows®-based operating systems, let alone any particular implementation or examples described herein. Instead, numerous ways to implement the present invention are feasible. Further, while an example notification model is described with reference to accessibility mirror drivers, numerous other arrangements may benefit from the technology described herein, including for example a serial chained driver model. As such, the present invention is not limited to any of the particular examples used herein, but rather may be used various ways that provide benefits and advantages in computing in general.

Figure 2:
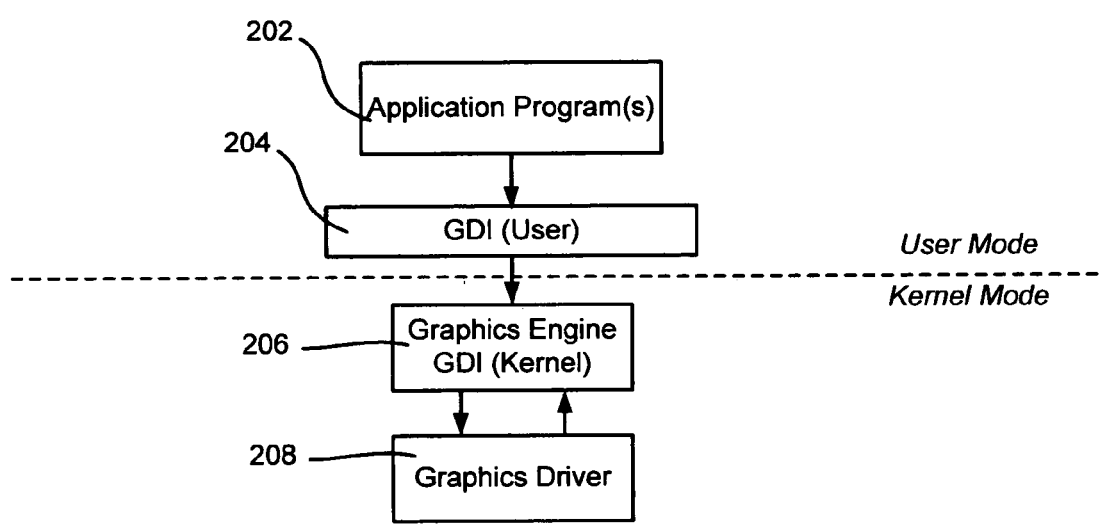
FIG. 2 is a block diagram representing an example architecture and a flow of information among components including from a program to a display (or printer) device driver to output information.

As represented in FIG. 2, GDI (the graphics device interface of Microsoft® Windows®) provides intermediary support between a Windows®-based graphics (display or printer) driver and application programs. In general, a user mode program 202 (and other such programs) may call Win32 GDI functions 204 to make graphics output requests, whereby these requests are provided to a kernel-mode GDI engine 206. For example, a GetDC function call retrieves a handle to a display device context (DC) for the client area of a specified window or for the entire screen. The returned handle may be used with subsequent GDI functions to draw in the device context.

In turn, the kernel-mode GDI engine 206 sends these requests to an appropriate graphics driver 208, such as a display driver (or printer driver). In general, GDI communicates with the graphics driver through a set of graphics device driver interface (graphics DDI) functions, which may be identified by their Drv prefix; (the driver supports certain DrvXxx functions for GDI to call). Information is passed between the GDI engine 206 and the driver through appropriate input/output parameters. The driver 208 supports the GDI engine's requests by performing the appropriate operations on its associated hardware before returning to the GDI engine 206.

In general, the GDI includes graphics output capabilities, eliminating the need for a driver to support such capabilities. The GDI also exports service functions that the driver can call, further reducing the amount of support the driver needs to provide. GDI-provided service functions are identified by an "Eng" prefix, and functions that provide access to GDI-maintained structures have names in the form XxxOBJ_Xxx.

Figure 3:
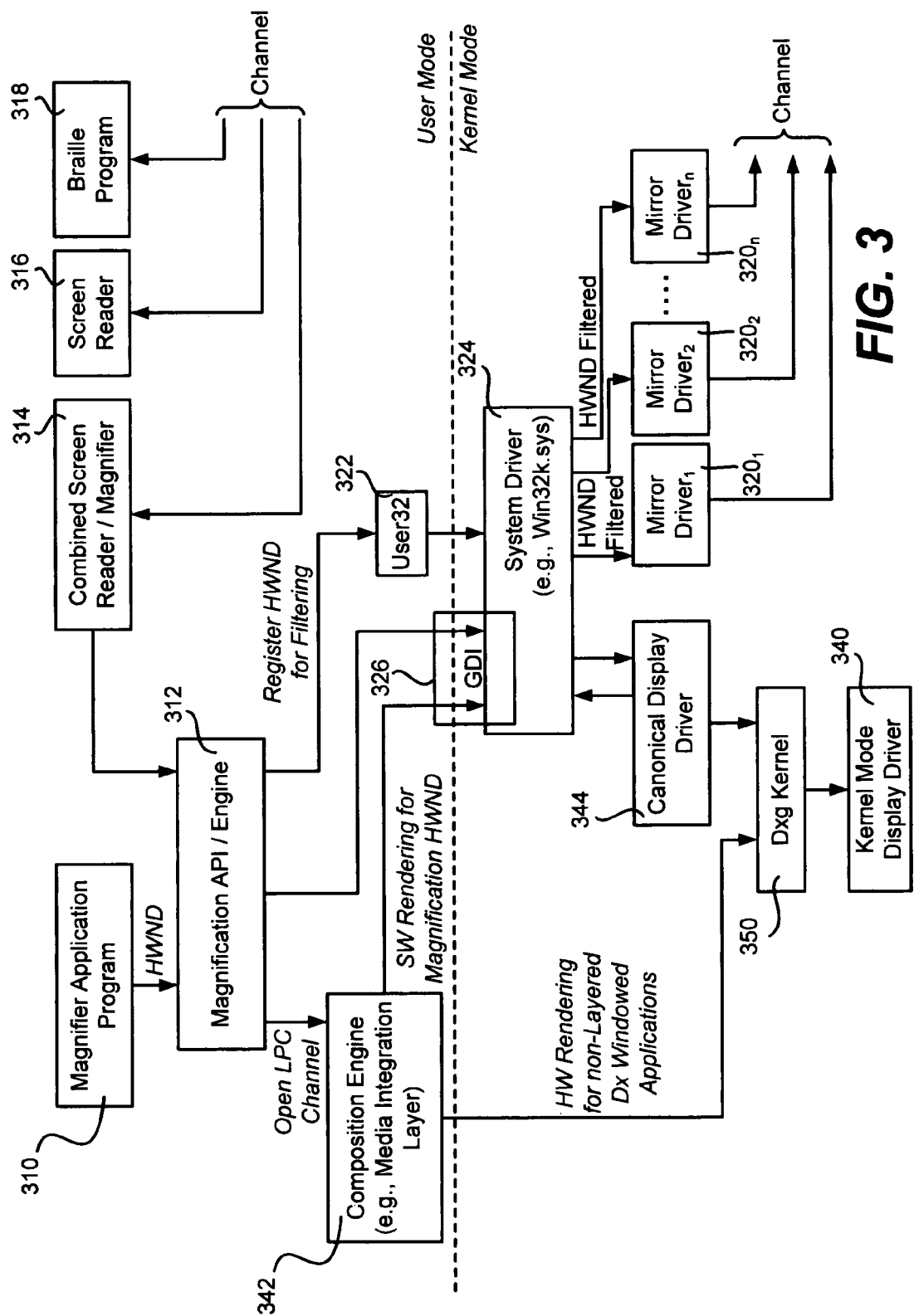
FIG. 3 is a block diagram representing an example architecture for selective exclusion of screen content returned to magnification programs.

FIG. 3 shows a more specific architecture in which accessibility-related programs such as magnifiers and screen readers may operate as user mode programs. For example, a magnifier application program 310 is shown as using the magnification API/engine 312 to provide its magnification functionality. Other user mode programs may include programs such as a combined screen reader/magnifier program 314, a screen reader program 316, a Braille program 318 and/or other such programs. While these example programs are represented in FIG. 3, it is understood that this is only an example, and a typical user may have anywhere from one to any practical number of such programs operating.

Note that in the example of FIG. 3, it is shown that the combined screen reader/magnifier 314 uses the magnification API/engine 312, as well as accessibility mirror driver technology, such as via the mirror driver$_1$ 320$_1$. The other user mode programs 316 and 318 likewise use one of the other mirror drivers (e.g., 320$_2$-320$_n$). Mirror drivers are also described in copending United States patent application entitled "Selective Rendering for Driver Classes," assigned to the assignee of the present invention, filed concurrently herewith, and hereby incorporated by reference.

Rendering paths are also represented in FIG. 3. By way of example, consider rendering content in a magnification window. As shown in FIG. 3, there are alternative rendering paths from the magnification API/engine 312 to the kernel mode display driver 340 that may be used. In general, the magnification API/engine 312 checks to see if it can open the graphics stream, which is essentially an LPC channel to the media integration layer (MIL) composition engine 342. If a connection to the graphics stream cannot be opened, magnification is implemented via the Win32k.sys system driver 324 (e.g., via GetDC(null) and StretchBlt).

If a connection to the graphics stream can be opened, magnification is implemented using the composition engine 342 in either software or hardware rendering mode. More particularly, hardware rendering may occur when the magnifier window is not a layered window and other hardware requirements to compose in hardware are met. If so, the magnifier window will be rendered in hardware as a windowed Dx application. The composition engine 342 uses DxgKernel interfaces 350 to draw to the kernel mode display driver 340.

Software rendering is instead used by the composition engine 342 when the magnifier window is a layered window or other hardware requirements to compose in hardware are not met. In such a situation, the magnifier window is rendered in software to a surface which is composited by a GDI sprite layer in the system driver (e.g., Win32k.sys).

In a situation where a connection to the graphics stream cannot be opened, the system driver (e.g., Win32k.sys) 324 calls DrvXXX functions implemented by a canonical display driver (CDD) 344. The canonical display driver 344 essentially implements a Windows® XP-type device driver interface, calls GDI support services in the system driver (Win32k.sys) 324 to render, and then draws to the display driver 340 via DxgKernel 350. Note that the canonical display driver 344, DxgKernel 350 and the display driver 340 are a secure path. Further note that the canonical display driver 344 essentially insulates other (e.g., Windows® Vista™-type) driver model display drivers from having to implement the Windows® XP-type device driver interface, and eliminate the need to avoid modifying Win32k.sys to work with a Dx interface, which other (e.g., Windows® Vista™-type) driver model display drivers support.

Figure 4:
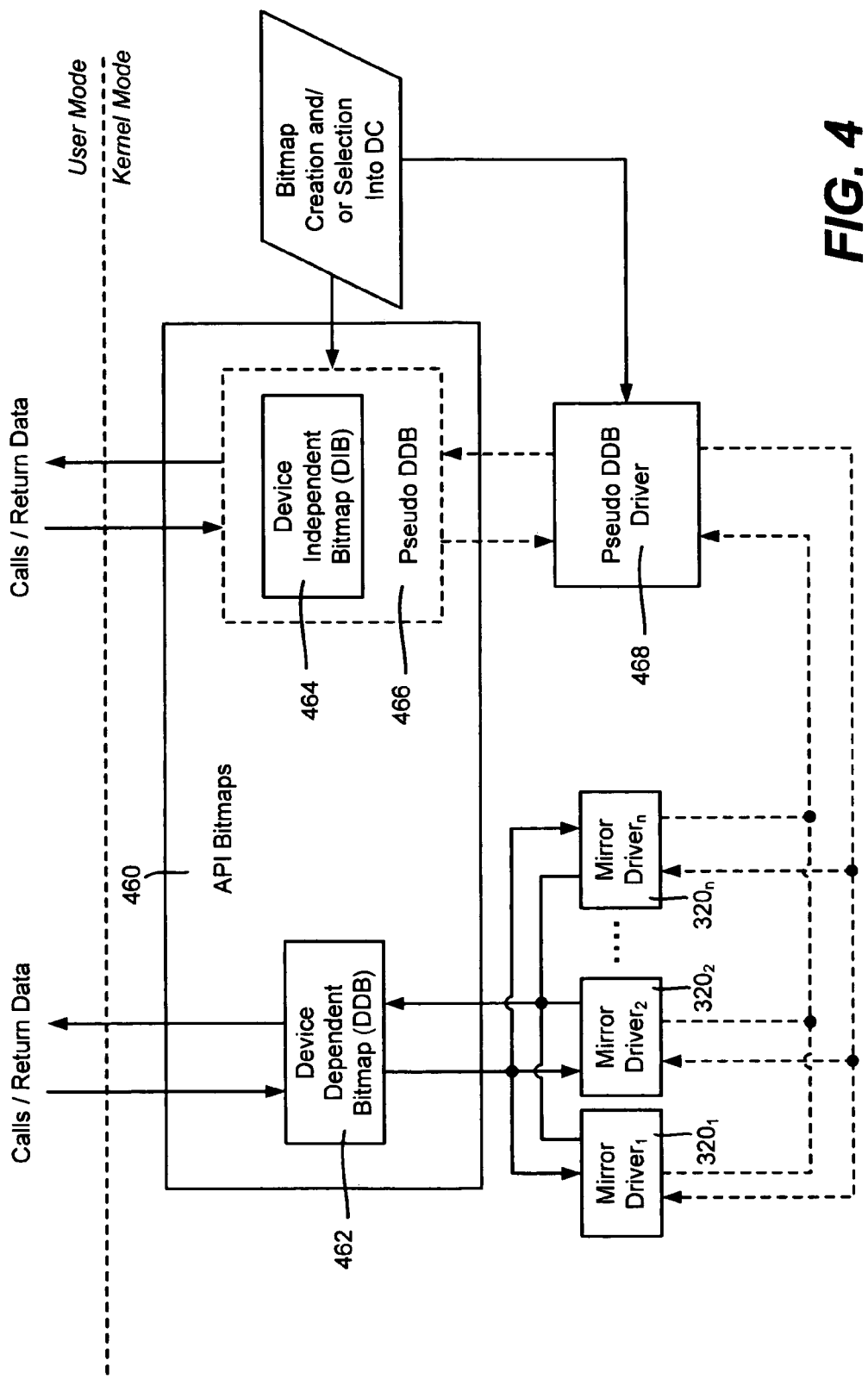
FIG. 4 is a block diagram representing notifications made to mirror drivers for calls to device independent bitmaps.

FIG. 4 represents an example notification model by which notifications are provided for drawing calls to device independent bitmaps. These bitmaps are created by function calls to GDI APIS, and are generally referred as API bitmaps 460. In FIG. 4, two types of bitmaps are shown, namely a device dependent bitmap 462, as well as a device independent bitmap 464. As is known, drivers are involved with device dependent bitmaps, (e.g., the driver will known of a Drv-TextOut call), however heretofore drivers were not involved with device independent bitmaps.

In general, the technology described herein extends the scope of which bitmaps drivers are involved with, namely relevant (e.g., mirror) drivers are notified of the calls to device independent bitmaps as well as to device dependent bitmaps. To this end, when an application selects a bitmap into a drawing context (DC), the GDI can make a device independent bitmap behave similarly to a device dependent bitmap (DDB).

In one implementation, this is accomplished via a pseudo DDB entity 466 that essentially wraps the device independent component such that calls will be made to the device independent bitmap 464 as if it was a DDB. A pseudo-DDB driver 468 (BmpDrvBitBlt) is also implemented, and because of the wrapper 466 will receive GDI calls whenever GDI attempts to draw to the device independent bitmap.

When a call comes in that is received at the pseudo-DDB driver 468, the pseudo-DDB driver 468 knows that the bitmap is actually regarding a device independent bitmap, and notifies the registered mirror drivers, e.g., $320_1$-$320_n$, providing them with the details of the calls as if they were receiving DDB information. Note that mirror drivers already receive call information for DDBs, as represented by the solid arrows in FIG. 4. The dashed lines in FIG. 4 represent the communication related to device independent bitmaps that takes place between the pseudo-DDB 466, the pseudo-DDB driver 468 and the registered mirror drivers, e.g., $320_1$-$320_n$, including the notifications that are sent.

The pseudo-DDB mechanism may be triggered by creation of the bitmap and/or by its selection into a drawing context. In the example notification model, bitmap notifications apply to device independent bitmaps that are created by GDI APIs, which may be by using one of the following functions:

| | |
|---|---|
| CreateBitmap | Creates a bitmap. |
| CreateBitmapIndirect | Creates a bitmap. |
| CreateCompatibleBitmap | Creates a bitmap compatible with a device. |
| CreateDIBitmap | Creates a device-dependent bitmap (DDB) from a DIB. |
| CreateDIBSection | Creates a DIB that applications can write to directly. |

Note that CreateCompatibleBitmap is an over-constraint, as mirror drivers are automatically called for drawing to device compatible bitmaps or DDBs. Further, note that another notification will be provided to indicate when GDI will no longer draw to a surface, eliminating the need to walk the GDI handle table structure to determine the lifespan of a surface.

While the create bitmap calls encompass all bitmaps that are created, including system-created bitmaps, applications often create bitmaps that are only used for temporary purposes. For efficiency, an alternative is to implement the pseudo-DDB notification mechanism for applications only when a bitmap is selected into a drawing context. In this way, an application program's creation of temporary and otherwise unused bitmaps need not trigger the pseudo-DDB notification mechanism.

In the example of FIG. 4, notifications are provided to the mirror drivers for any surface that is registered for having calls thereto sent. A gbMirrorInclude flag indicates whether a surface is registered for redirection of drawing calls to mirror drivers. In one implementation, each registered accessibility mirror driver (e.g., $320_1$) receives a notification via a function call that emulates a GDI DDI drawing primitive to that surface. Because the mirror driver will already receive drawing calls to device dependent bitmaps, the mirror driver should only have to determine that the new calls are now destined for a device independent bitmap.

As described above, in one implementation, notifications will be provided only to drivers that register as accessibility mirror drivers, which may be accomplished using existing registration mechanisms; (alternative implementations may allow notifications to other drivers). One such registration mechanism is generally related to the registration mechanism described in the aforementioned application entitled "Selective Rendering for Driver Classes," and is performed by the mirror driver by setting a GCAPS2_EXCLUDELAYERED attribute (e.g., a flag) to an appropriate value, which is part of an HWND filtering mechanism for accessibility mirror drivers. The flag specifies that the driver is an accessibility mirror driver; setting this flag is equivalent to a mirror display driver self-identifying as an accessibility mirror driver:

define GCAPS2_EXCLUDELAYERED
    0x00000800

With respect to drawing calls made via standard DDI calls, that is, via DrvXXX( ), the accessibility mirror driver receives notifications of drawing calls made to a surface via calls to GDI DDI primitives. Such calls include DrvTextOut( ), DrvLineTo( ) and so forth, as set forth below. To identifying drawing calls as non-DDB drawing calls, note that normally a mirror display driver will only receive calls to DDBs; this applies to the canonical case of a standard display driver as well. Because the mirror driver is now receiving calls for non-DDB GDI API created bitmaps, it needs to handle these calls without failing unexpectedly.

These drawing calls can be distinguished by checking a flag in a surface data (SURFOBJ) structure to determine if the destination of the call is to a device independent bitmap or to the screen. Note that this logic already exists because while display drivers today did not receive drawing calls for DIB sections, they still had to render both DIB and DDBs. This logic required some conditions, namely that if the SURFOBJ structure represents a DDB, then the driver needs to be able to locate the device handle for the surface, and if the SURFOBJ structure represents a GDI bitmap/DIB, then the driver needs to be able to determine the format of the bitmap and locate the bitmap bits.

Before any rendering can happen to a bitmap, the application needs to call a standard GDI function named SelectObject to insert a Bitmap object into the current device context as in the following example:

```
HGDIOBJ SelectObject(
    HDC hdc,           // handle to DC
    HGDIOBJ hgdiobj    // handle to object
);
```

Notification is provided for any rendering calls between the <start rendering operations> and <end rendering operations> tags in the following sample:

```
hbm_old = SelectObject(hdc, hbm_new);
<begin rendering operations)
...
BitBlt( );
...
<end rendering operations>
SelectObject(hdc, hbm_old);
```

These tags correspond to the insertion of an HDIOBJ into the hardware device context and the resetting of the hardware device context back to the default object.

Figure 5:
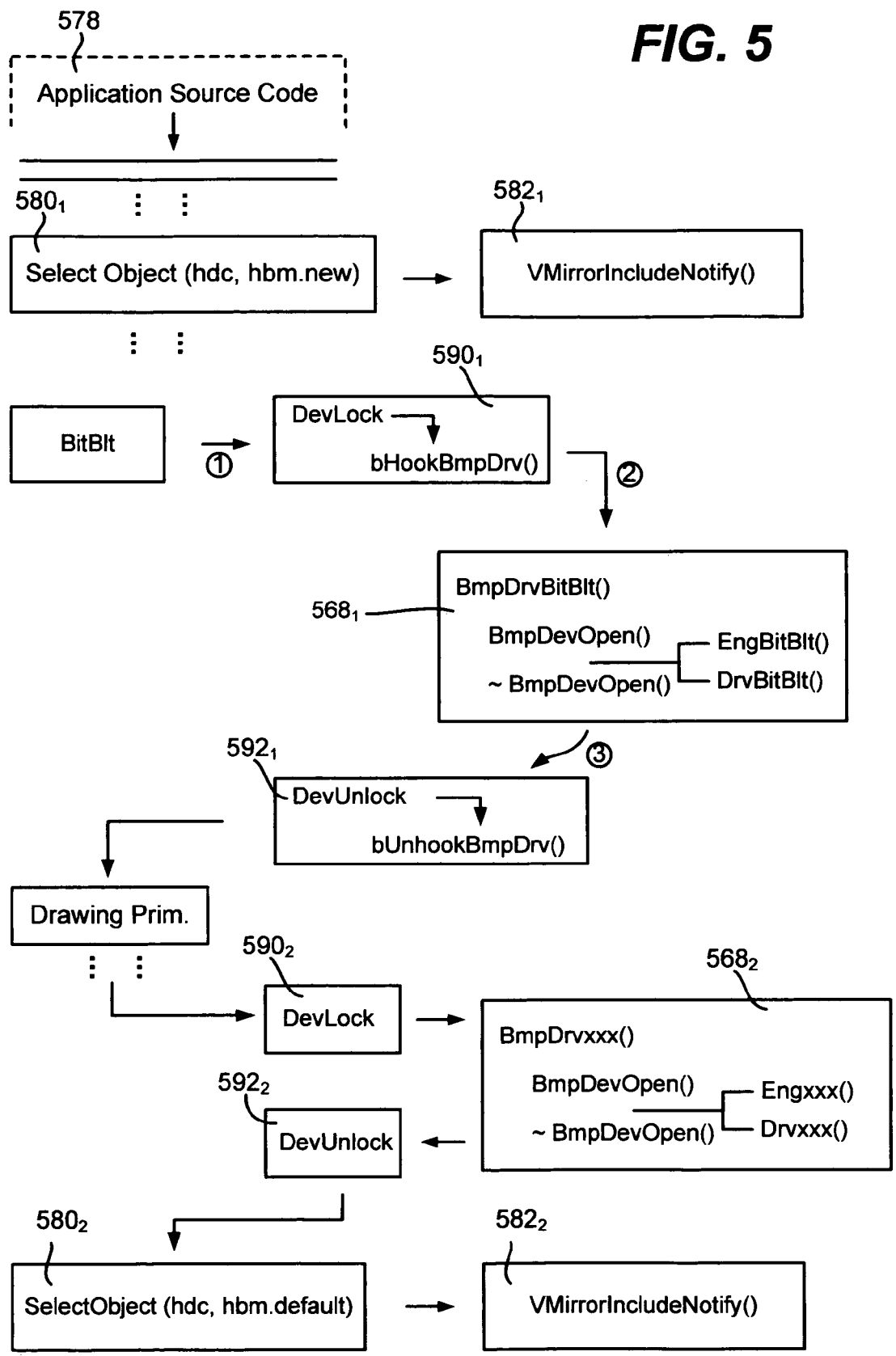
FIG. 5 is a diagram representing the flow of operations among components notifications made to notify mirror drivers for calls to device independent bitmaps.

FIG. 5 represents the flow initiated by application source code 578, including the initialization of the system driver (e.g., Win32k.sys) component's state to trigger device independent bitmap notifications. As represented in FIG. 5, a SelectObject function (blocks $580_1$ and $580_2$) is called twice. Each time SelectObject is called, SelectObject in turn calls vMirrorIncludeNotify (blocks $582_1$ and $582_2$) to mark the drawing context (DC) and GDI API bitmap for drawing call redirection to registered mirror drivers.

As described above, the DIB/Bitmap driver component (BmpDrvBitBlt) represented as the block $568_1$ in FIG. 5 corresponds to the psudeo-DDB driver 468 in FIG. 4, and comprises a layered DIB/bitmap driver that traps rendering to GDI API bitmaps. In this manner, registered mirror drivers are called when any redirection to bitmaps occur. Note that a devlock operation (e.g., $590_1$ and $590_2$) occurs for every drawing call between SelectObject( ) calls; devlocks and SelectObject calls are thus serialized. The devlock is used to synchronize the surface, and Devlock makes the surface opaque. The devunlock operation (e.g., $592_1$ and $592_2$) occurs after every drawing call between SelectObject( ) has completed; devunlock operations are thus serialized with respect to SelectObject( ) and Devlock operations, and Devunlock makes the surface non-opaque. Note that in FIG. 5, the steps represented by the arrows labeled with circular numerals one (1) to three (3) are repeated for each GDI drawing primitive.

The BmpDrvXXX( ) functions $568_2$ are implemented in the pseudo-driver 468 that hooks the standard GDI drawing calls, whereby its implementation of the drawing calls BMD-DrvXXX are called whenever the MirrorInclude SURFOBJ bit is set and drawing is redirected to GDI API bitmaps. These calls include TextOut, StrokePath, CopyBits, BitBlt, LineTo, FillPath, StrokeandFillPath, StretchBlt, AlphaBlend, TransparentBlt, GradientFill, PlgBlt.

As also represented in FIG. 5, the VMirrorIncludeNotify function—VOID vMirrorIncludeNotify(XDCOBJ& dco, SURFACE*pSurf, BOOL bEnable)—marks a DC and a GDI API bitmap such that registered mirror drivers will be notified of rendering calls to the bitmap as they occur. When a gbMirrorInclude global variable is set, then this function synchronizes access to the surface and sets an inclusion flag on the surface for mirror drivers. If the condition is false, then this function resets the flag. As mentioned above, the VMirrorIncludeNotify function is called from SelectObject twice, once when the surface is selected into the hdc, and once when the default surface is selected back into the hdc.

The bHookBmpDrv function—BOOL bHookBmpDrv (XDCOBJ& dco)—sets up the function pointers to the BmpDrvXXX drawing calls that are now called for standard drawing operations to a GDI API bitmap. This function makes the surface referenced inside the specified dco (device context object) opaque (DIBs are normally meant to be opaque to display drivers), and sets a reference in the dco to the Bitmap driver's private data structure (PDEV) so that calls are now sent to this driver; (note that a PDEV comprises a private, driver-defined data structure containing the information and data that represents an associated physical device).

The bUnHookBmpDrv function—BOOL bUnHookBmpDrv(XDCOBJ& dco)—makes the surfaced referenced inside dco non-opaque and resets the reference to a PDEV to the default object. The bBmpMakeOpaque function—BOOL bBmpMakeOpaque(PSURFACE ps)—makes the surface opaque by setting various flags in the surface structure.

The bBmpUndoMakeOpaque function—BOOL bBmpUndoMakeOpaque(PSURFACE ps)—makes the surface non-opaque or transparent by resetting flags set by BmpMakeOpaque.

As also represented in FIG. 5 The BMPDEVOPEN function—BMPDEVOPEN(SURFOBJ*pso)—is a constructor. If the surface has been marked to be included for notification (bMirrorInclude=TRUE) to mirror drivers, then bBmpUndoMakeOpaque is called by the BMPDEVOPEN constructor. The ~BMPDEVOPEN( ) function—~BMPDEVOPEN( )—is a destructor that calls bBmpMakeOpaque. This function makes the bitmap opaque again since DIBs are normally meant to be opaque to display drivers.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method of providing a mirror driver with graphic calls to a device independent bitmap, the mirror driver comprising a driver that is not inserted into the video path of a main display driver, the method comprising:
  receiving a call associated with displaying a device independent bitmap, the device independent bitmap being stored in memory of a computing system;
  in response to receiving the call, generating a pseudo device independent bitmap entity and a driver, wherein the pseudo device independent bitmap entity acts as a wrapper that wraps the device independent bitmap such that it receives graphics calls to the device independent bitmap and routes the graphics calls to the driver;
  upon receiving a graphics call to manipulate the device independent bitmap, the pseudo device independent bitmap entity routing the graphics call to the driver;

upon receiving the graphics call, the driver generating a function call, based on the graphics call, that emulates a drawing primitive; and the driver sending the function call to the mirror driver such that the mirror driver receives function calls associated with the device independent bitmap rather than only receiving the bits of the device independent bitmap.

2. The method of claim 1 wherein the call associated with displaying the device independent bitmap comprises a call that selects the device independent bitmap to be displayed in a drawing context of a display.

3. The method of claim 1 wherein the call associated with displaying the device independent bitmap comprises a call that creates the device independent bitmap.

4. The method of claim 1 further comprising:
upon the mirror driver receiving a graphics call from the driver, the mirror driver detecting that the graphics call corresponds to a device independent bitmap rather than a device dependent bitmap.

5. The method of claim 4 wherein the mirror driver detects that the graphics call corresponds to a device independent bitmap by accessing a flag corresponding to the graphics call.

6. The method of claim 1 wherein the graphics calls associated with the device independent bitmap received by the mirror driver comprise calls that modify the device independent bitmap.

7. The method of claim 6 wherein the calls that modify the device independent bitmap comprise drawing primitives.

8. The method of claim 1 wherein the graphics calls associated with the device independent bitmap received by the mirror driver emulate graphics calls associated with device dependent bitmaps.

9. A computer-readable storage medium having computer-executable instruction which when executed perform a method for providing a mirror driver with graphics calls to a device independent bitmap, the mirror driver comprising a driver that is not inserted into the video path of a main display driver, comprising:
receiving a call associated with displaying a device independent bitmap;
in response to receiving the call, generating a pseudo device independent bitmap entity and a driver, wherein the pseudo device independent bitmap entity acts as a wrapper that wraps the device independent bitmap such that it receives graphics calls to the device independent bitmap and routes the graphics calls to the driver;
upon receiving a graphics call to manipulate the device independent bitmap, the pseudo device independent bitmap entity routing the graphics call to the driver;
upon receiving the graphics call, the driver generating a function call, based on the graphics call, that emulates a drawing primitive; and
the driver sending the function call to the mirror driver such that the mirror driver receives function calls associated with the device independent bitmap rather than only receiving the bits of the device independent bitmap.

10. The computer-readable storage medium of claim 9 wherein the call associated with displaying the device independent bitmap comprises a call that selects the device independent bitmap to be displayed in a drawing context of a display.

11. The computer-readable storage medium of claim 9 wherein the call associated with displaying the device independent bitmap comprises a call that creates the device independent bitmap.

12. The computer-readable storage medium of claim 9 further comprising:
upon the mirror driver receiving a graphics call from the driver, the mirror driver detecting that the graphics call corresponds to a device independent bitmap rather than a device dependent bitmap.

13. The computer-readable storage medium of claim 12 wherein the mirror driver detects that the graphics call corresponds to a device independent bitmap by accessing a flag corresponding to the graphics call.

14. The computer-readable storage medium of claim 9 wherein the graphics calls associated with the device independent bitmap received by the mirror driver comprise calls that modify the device independent bitmap.

15. A system for providing a mirror driver with graphic calls to a device independent bitmap, the mirror driver comprising a driver that is not inserted into the video path of a main display driver, the system comprising:
a processor; and
memory storing instruction which when executed by the processor perform the following steps:
receiving a call associated with displaying a device independent bitmap;
in response to receiving the call, generating a pseudo device independent bitmap entity and a driver, wherein the pseudo device independent bitmap entity acts as a wrapper that wraps the device independent bitmap such that it receives graphics calls to the device independent bitmap and routes the graphics calls to the driver;
upon receiving a graphics call to manipulate the device independent bitmap, the pseudo device independent bitmap entity routing the graphics call to the driver;
upon receiving the graphics call, the driver generating a function call, based on the graphics call, that emulates a drawing primitive; and
the driver sending the function call to the mirror driver such that the mirror driver receives function calls associated with the device independent bitmap rather than only receiving the bits of the device independent bitmap.

16. The system of claim 15 wherein the call associated with displaying the device independent bitmap comprises a call that selects the device independent bitmap to be displayed in a drawing context of a display.

17. The system of claim 15 wherein the call associated with displaying the device independent bitmap comprises a call that creates the device independent bitmap.

18. The system of claim 15 further comprising:
upon the mirror driver receiving a graphics call from the driver, the mirror driver detecting that the graphics call corresponds to a device independent bitmap rather than a device dependent bitmap.

19. The system of claim 18 wherein the mirror driver detects that the graphics call corresponds to a device independent bitmap by accessing a flag corresponding to the graphics call.

* * * * *